(12) United States Patent
Liu

(10) Patent No.: US 8,061,696 B2
(45) Date of Patent: Nov. 22, 2011

(54) SHOCK-ABSORBING SPRING FOR VEHICLES

(75) Inventor: Ching-Liang Liu, Yanchao Township, Kaohsiung County (TW)

(73) Assignee: Yang Min Enterprise Corporation, Yanchao Township (TW)

( * ) Notice: Subject to any disclaimer, the term of this patent is extended or adjusted under 35 U.S.C. 154(b) by 517 days.

(21) Appl. No.: 12/233,259

(22) Filed: Sep. 18, 2008

(65) Prior Publication Data

US 2010/0065997 A1 Mar. 18, 2010

(51) Int. Cl.
*F16F 1/06* (2006.01)

(52) U.S. Cl. .......................................... 267/166; 267/180

(58) Field of Classification Search ........... 267/166–180
See application file for complete search history.

(56) References Cited

U.S. PATENT DOCUMENTS

| | | | | |
|---|---|---|---|---|
| 2,666,636 | A * | 1/1954 | Wulff | 267/4 |
| 4,735,403 | A * | 4/1988 | Matsumoto et al. | 267/180 |
| 4,923,183 | A * | 5/1990 | Saka | 267/180 |
| 4,957,278 | A * | 9/1990 | Komura et al. | 267/166 |
| 5,259,599 | A * | 11/1993 | Hernandez | 267/180 |
| 2002/0190451 | A1* | 12/2002 | Sancaktar et al. | 267/166 |

* cited by examiner

*Primary Examiner* — Christopher Schwartz

(57) ABSTRACT

A shock-absorbing spring for vehicles has a deformed egg-shaped cross section different from a conventional round cross section. In comparison to the conventional spring under a same length, the invention has a lighter weight and a longer spring travel. Moreover, stress can be uniformly distributed toward two sides of the cross section of the invention so that the invention can bear more stress and lengthen its service life.

6 Claims, 6 Drawing Sheets

SHOCK-ABSORBING SPRING FOR VEHICLES

BACKGROUND OF THE INVENTION

1. Field of the Invention

This invention relates to a shock-absorbing spring for vehicles, particularly to one having a deformed egg-like cross section capable of lightening the spring, advancing stress enduring ability and spring travel.

2. Description of the Prior Art

Commonly, a shock absorber is installed in a chassis of a vehicle to effectively keep tires contacting on ground to minimize unnecessary jumps, shocks or impacts while running on an unsmooth road, providing a better cornering traction so that a driver can comfortably drive a vehicle.

As shown in FIG. 1, a conventional shock absorber is usually composed of a spiral spring that is easily made of round steel bar. But, such a circular cross-sectional shock absorber is restricted in its usable scope; so if a compressible length is to be stepped up, the spiral spring has to be lengthened, posing a heavy weight to make it hardly installed. Moreover, as stress is to concentrate at the inside of the spiral spring while the spiral spring is compressed, breakage may be apt to happen to shorten service life of the spiral spring.

In order to overcome the disadvantages of the circular cross-sectional spiral spring mentioned above, a rectangular and a trapezoid cross-sectional spring has been devised to further step up coefficient of elasticity (K value). However, the stress is as well to concentrate at the inside of the spring while the spring is stressed, restricting the compressible length. While the trapezoid spring can prevent stress from concentrating at the inside of the spring as the rectangular spring can, the compressible length is still unable to be further lengthened because the outer height (the bottom of the trapezoid) of the spring is too large. In addition, such a trapezoid spring is uneasy to be manufactured, thus not popular in practice.

SUMMARY OF THE INVENTION

The object of this invention is to offer a shock-absorbing spring for vehicles. The spring has a deformed egg-like cross section capable of lightening the spring, advancing stress enduring ability and the compressible length, so as to lengthen service life of the spring.

The cross section of the shock-absorbing spring is provided with a first arc portion derived from an inner circle, two symmetrical second arc portions respectively derived from a side circle and connected with said first arc portion, a third arc portion derived from an outer circle, two tangent lines respectively connected between each of said second arc portions and each end of said third arc portion.

In designing the cross section, an inner center and a virtual outer center are picked on a central line, and an inner radius and a virtual outer radius are determined, with a center distance between the inner center and the virtual outer center. Accordingly, an inner circle and a virtual outer circle are respectively created, with part arc of said inner circle formed as said first arc portion. Next, properly select a preset point on the inner circle and the virtual outer circle respectively for being used as a first and a second intersection point intersected with a side circle. An extended line of the first intersection point of the side circle and the inner circle and the inner center is to intersect with that of the second intersection point of the side circle and the virtual outer circle at a third intersection point that is to be the center of the side circle. Thus, in accordance with the side center and the side radius, the side circle can be created to respectively intersect with the inner circle and the virtual outer circle at the first and the second intersection points, with part arc of said side circle formed as said second arc portion that is symmetrically obtained at two sides of said central line. Then, take a fourth intersection point of the central line and the virtual outer circle as a starting point to find an outer center of an outer circle on the central line according to a chosen outer radius. Accordingly, the outer circle (arc) can be thus created, with part arc of said outer circle formed as said third arc portion. Finally, a tangent line of the side circle at the second intersection point with the virtual outer circle is to meet with the outer circle. The design of the cross section of the invention is thus finished.

BRIEF DESCRIPTION OF DRAWINGS

This invention is better understood by referring to the accompanying drawings, wherein.

Table 1 shows data of properties for comparing the cross section of the invention with that of the conventional spring.

DETAILED DESCRIPTION OF THE PREFERRED EMBODIMENT

A shock-absorbing spring 1 for vehicles in the invention is generally available for a variety of vehicles such as an automobile, a motorbike or a bike etc. As the concept and the installed location of a shock absorber of a vehicle is well known, they are not to be described herein.

Figure 1:
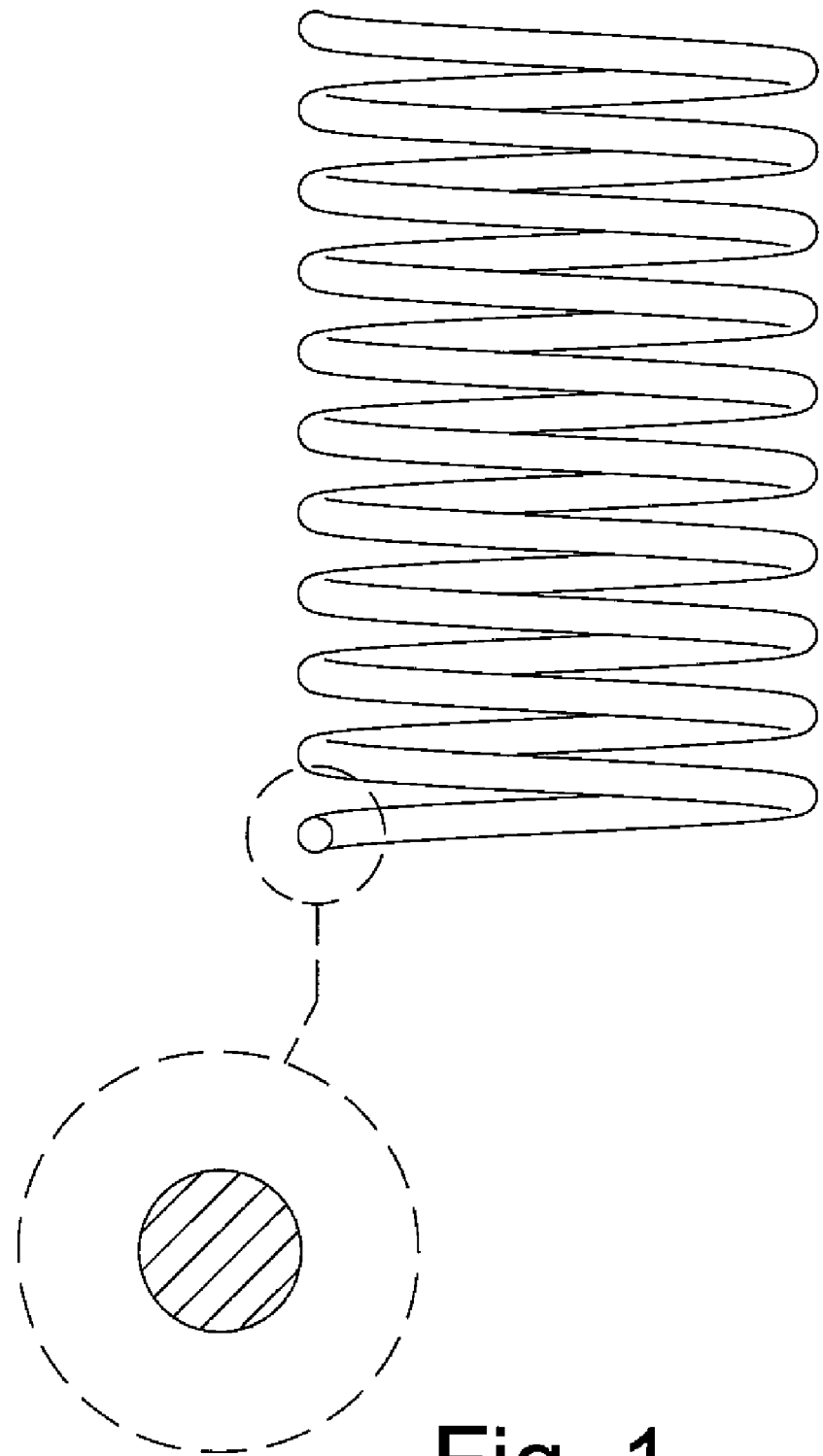
FIG. 1 is a perspective and a cross-sectional view of a conventional spring.
Figure 2:
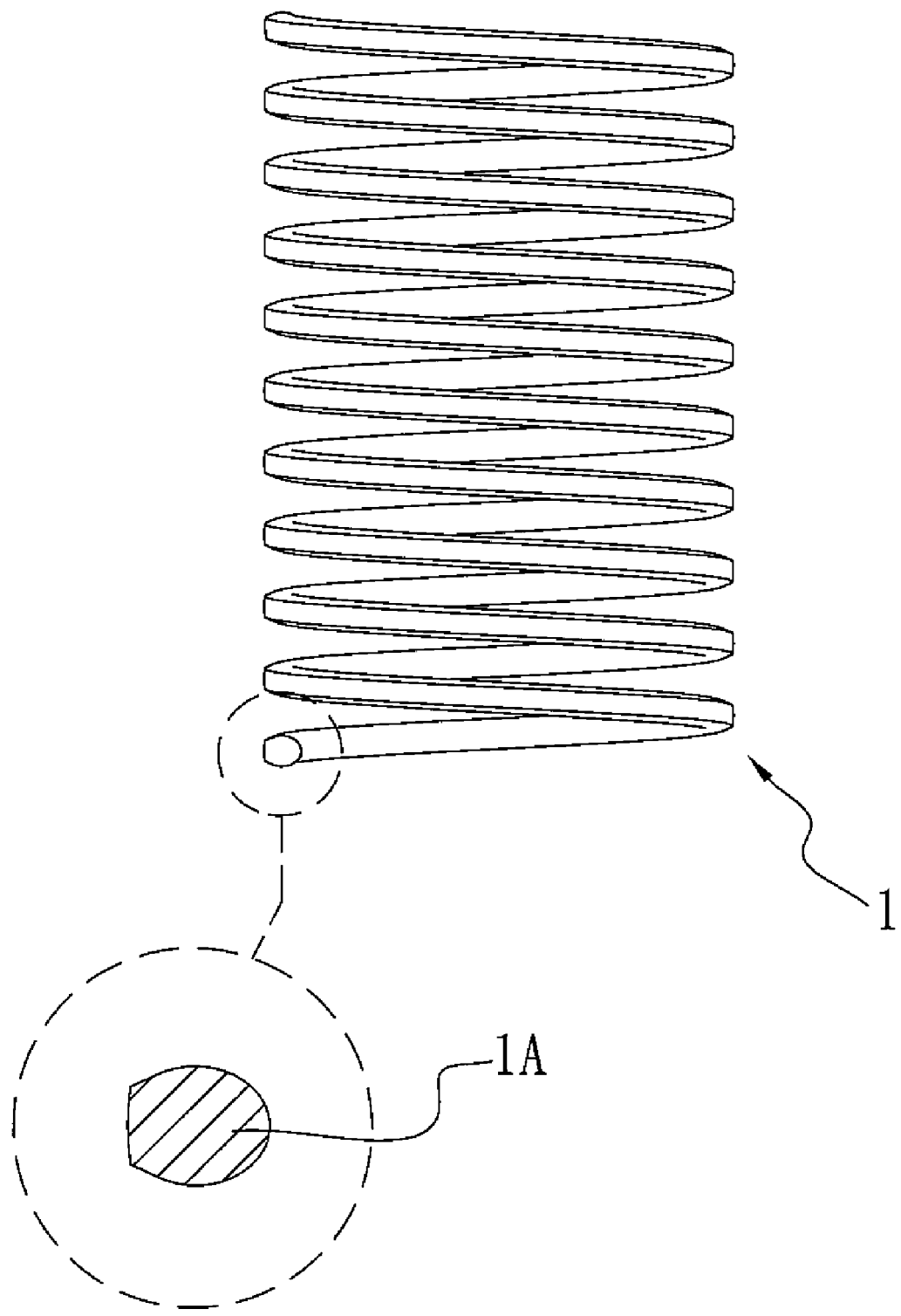
FIG. 2 is a perspective and a cross-sectional view of a preferred embodiment of a shock-absorbing spring for vehicles in the present invention, showing it being formed as a straight column.
Figure 3:
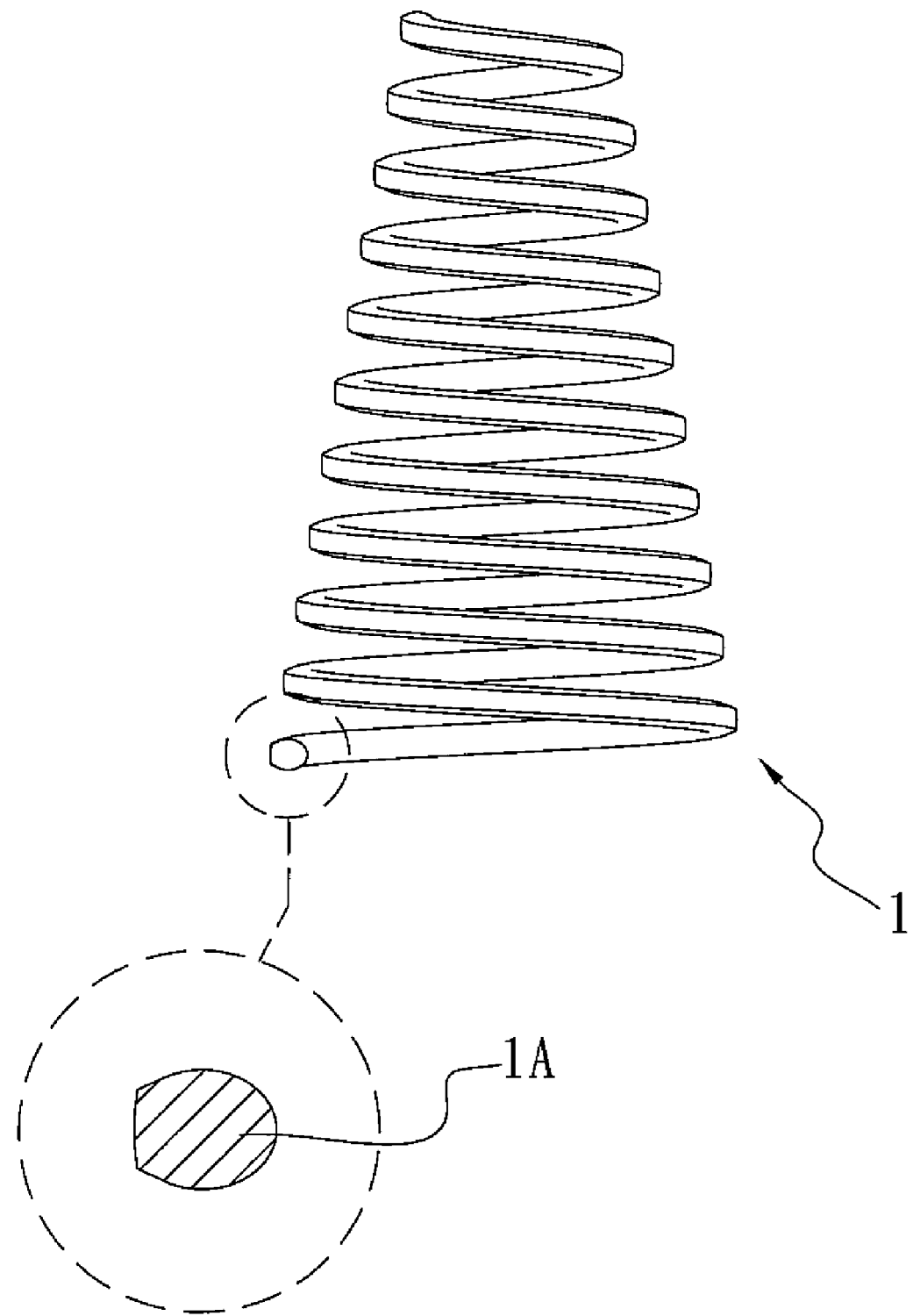
FIG. 3 is a perspective and a cross-sectional view of the preferred embodiment of a shock-absorbing spring for vehicles in the present invention, showing it being formed as a conical column.
Figure 4:
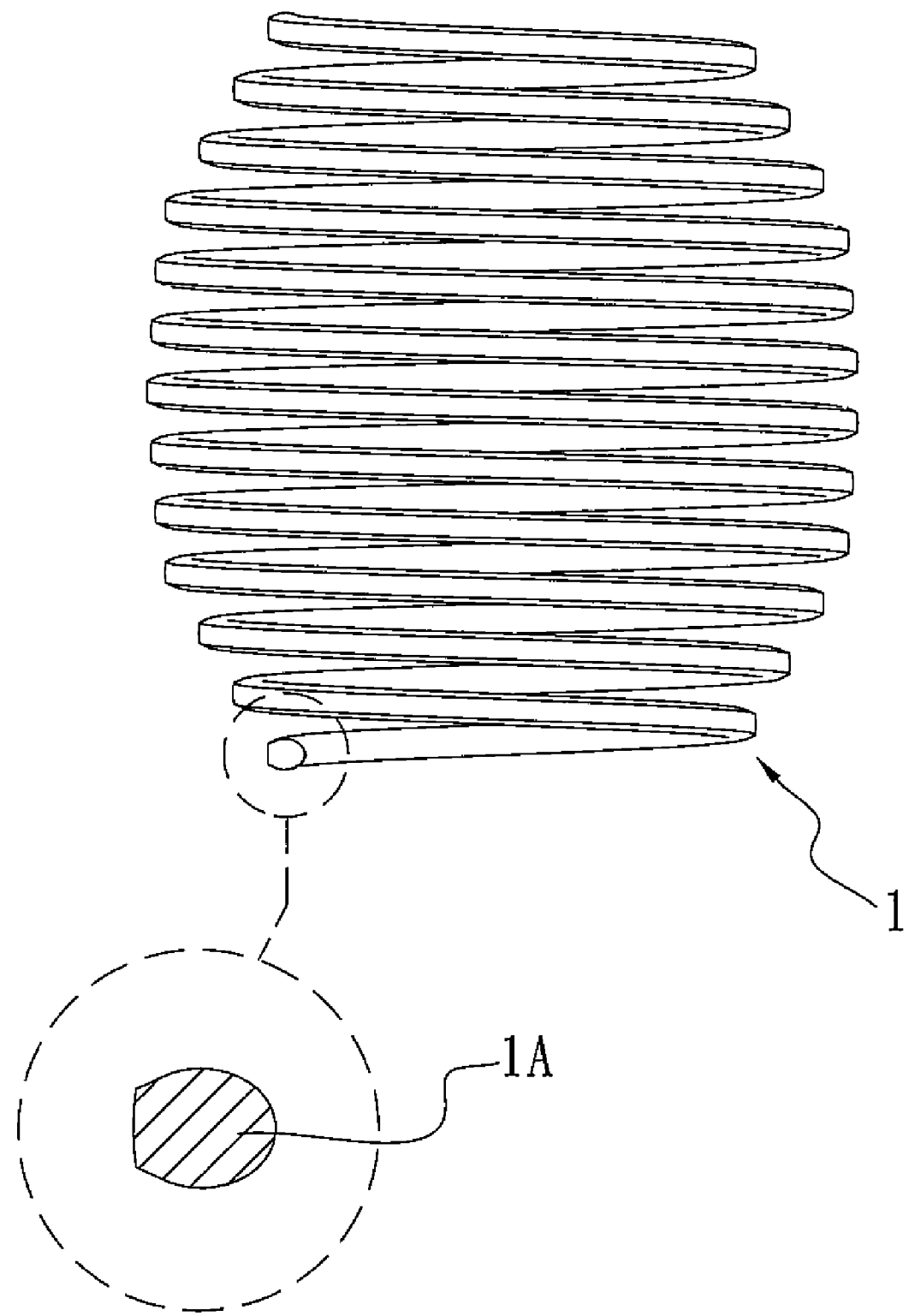
FIG. 4 is a perspective and a cross-sectional view of the preferred embodiment of a shock-absorbing spring for vehicles in the present invention, showing it being formed as a barrel with a larger belly.

As shown in FIGS. 2, 3 and 4, the shock-absorbing spring 1 for vehicles in the present invention is integrally made of a spiral steel bar with particular specifications, formed like a straight column (shown in FIG. 2), a conical column (shown in FIG. 3) and a barrel with a larger belly (shown in FIG. 4).

Figure 5:
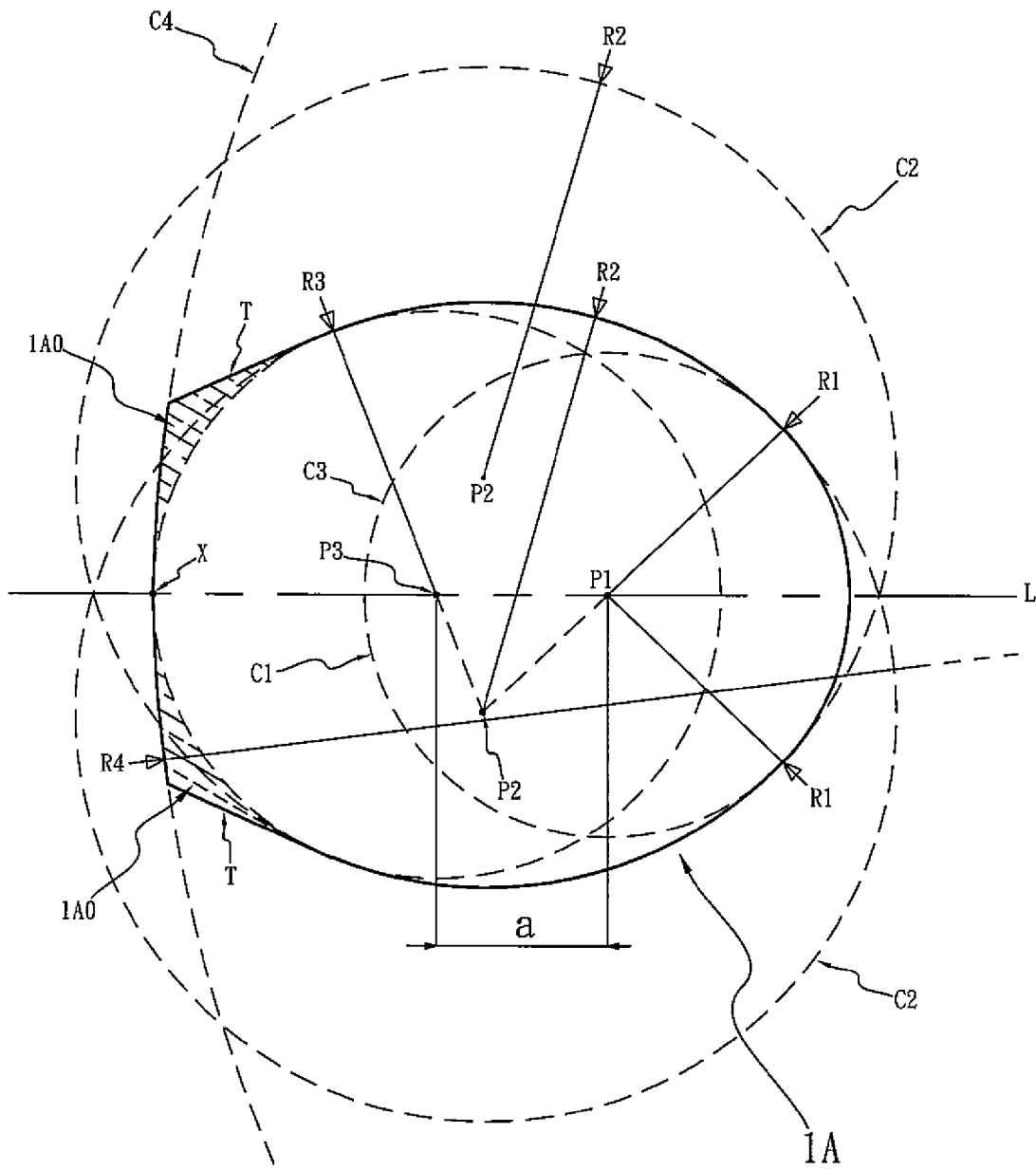
FIG. 5 is a cross-sectional view of the preferred embodiment of a shock-absorbing spring for vehicles in the present invention, showing how it is designed.

FIG. 5 shows a cross section (1A), which is formed like a deformed egg, of the shock-absorbing spring 1. The cross section 1 is provided with a first arc portion derived from an inner circle (C1), two symmetrical second arc portions respectively derived from a side circle (C2) and connected with said first arc portion, a third arc portion derived from an outer circle (C4), two tangent lines (T) respectively connected between each of said second arc portions and each end of said third arc portion.

In designing the cross section 1, an inner center (P1) and a virtual outer center (P3) are picked on a central line (L), and an inner radius (R1) and a virtual outer radius (R3) are determined, with a center distance (a) between the centers (P1) and (P3). According to the centers (P1) and (P3) and the radiuses (R1) and (R3), an inner circle (C1) and a virtual outer circle (C3) are respectively created, with part arc of said inner circle (C1) formed as said first arc portion. Next, properly select a preset point on the circles (C1) and (C3) respectively for being used as a first and a second intersection point intersected with a side circle (C2). An extended line of the first intersection point of the circles (C2) and (C1) and the inner center (P1) is to intersect with that of the second intersection point of the circles (C2) and (C3) and the virtual outer center (P3) at a third intersection point, which is to be a center (P2) of the side circle (C2) with a side radius (R2). Thus, in accordance with the center (P2) and the side radius (R2), the side circle (C2) can be created to respectively intersect with the circles (C1) and (C3) at the two (the first and the second) intersection points, with part arc of said side circle (C2) formed as said second arc portion that is symmetrically obtained at two sides of said central line (L). Then, choose an outer radius (R4) longer than the virtual outer radius (R3). Taking the fourth intersection point (X) of the central line (L) and the virtual outer circle (C3) as a starting point, an outer center (not shown in FIG. 5) of an outer circle (C4) (only part of it shown in FIG. 5) having the outer radius (R4) can be found on the central line (L) (not shown in Figures). Accordingly, the outer circle (arc) (C4) can be created, with part arc of said outer circle (C4) formed as said third arc portion. Then, a tangent line (T) of the side circle (C2) at the second intersection point with the virtual outer circle (C3) can meet with the outer circle (C4) so that a triangle-like area (1A0) is confined by the virtual outer circle (C3), the outer circle (C4) and the tangent line. Therefore, the cross section (1A) of the invention is created accordingly.

Above-mentioned side radius (R2) of the side circle (C2) is larger than virtual outer radius (R3) of the virtual outer circle (C3), and the virtual outer radius (R3) of the virtual outer circle (C3) is larger than inner radius (R1) of the inner circle (C1), and the outer radius (R4) of the outer circle (C4) is larger than virtual outer radius (R3) of the virtual outer circle (C3).

With ratios between the center distance (a) and the radiuses (R1)~(R4) restricted in a particular range (or limited as a dimensionless parameter such as R1/a, R2/a, R3/a and R4/a), and via simulation and integration of a series of number based on the parameters mentioned previously, the cross section (1A) of the invention is accordingly found after repeating "try and error", with a spring index (C) obtained in a proper range (the spring index (C) selected in the invention ranges from 4 to 10) so as to gain the deformed egg-shaped cross section (1A) of the spring with optimal parameters.

Figure 6:
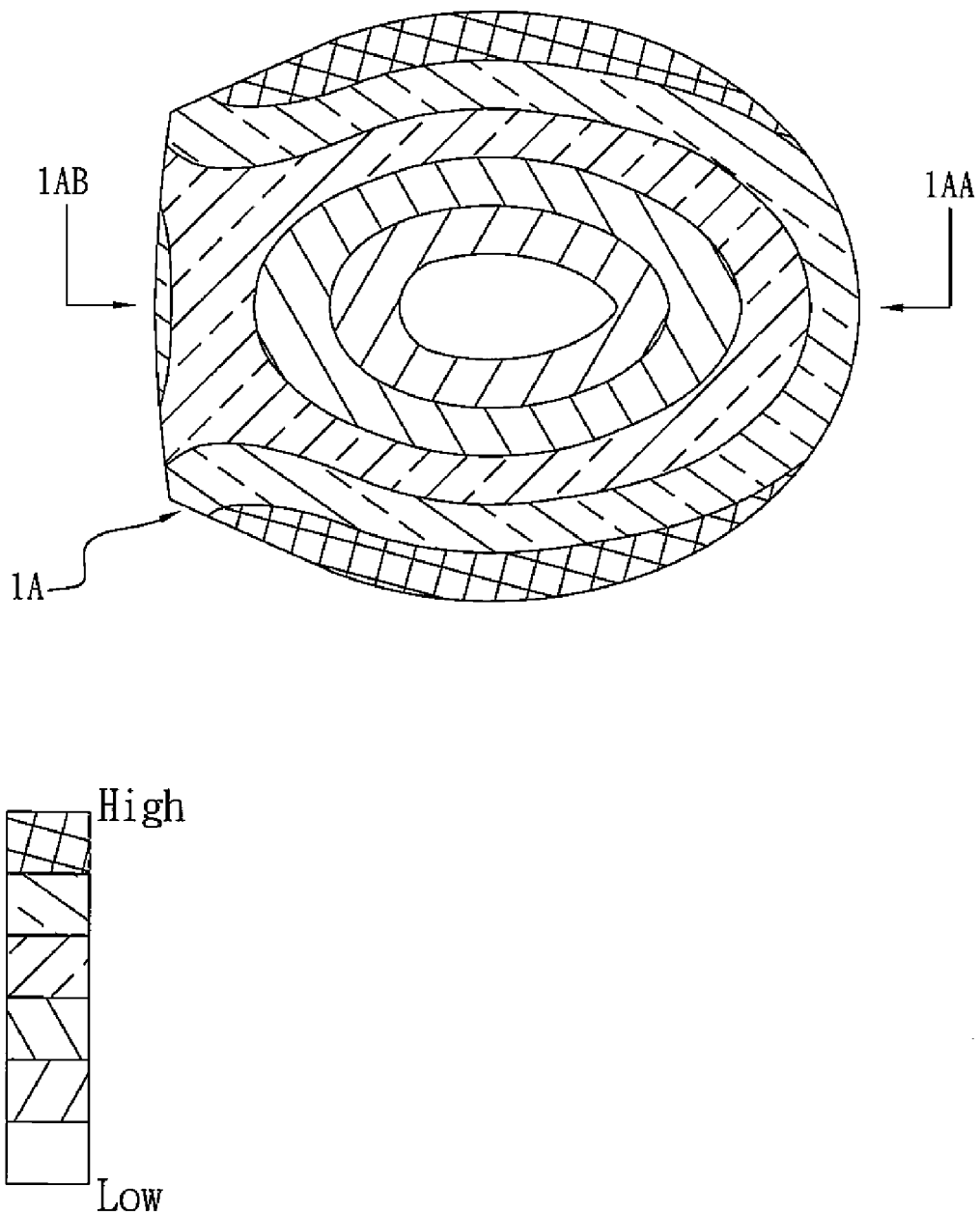
FIG. 6 is a cross-sectional view of the preferred embodiment of a shock-absorbing spring for vehicles in the present invention, showing a distribution of stress.

FIG. 6 shows a stress distribution of the cross section of the spring in the invention. Accordingly, the stress endured by the spring is scattered toward an inside (1AA) and an outside (1AB) of the cross section (1A) so that stress can be uniformly born by the cross section to enable the spring to sustain more stress.

TABLE 1

| | round cross-sectional spring | deformed egg-like cross-sectional spring - sample 1 | | deformed egg-like cross-sectional spring - sample 2 | |
|---|---|---|---|---|---|
| spring length (mm) | 220 | 220 | | 220 | |
| spring index | 6.780 | 6.112 | | 6.10 | |
| spring coefficient (kg/mm) | 8.03 | 8.25 | | 8.12 | |
| spring weight (gram) | 1440.186 | 1364.910 | −5.22% | 1277.44 | −11.3% |
| spring travel (mm) | 133.710 | 151.645 | 13.4% | 153.49 | 14.8% |
| spring maximum stress (kg/mm$^2$) | 115 | 130 | 13% | 135 | 17.3% |

Table 1 shows some data of properties for comparing the deformed egg-shaped cross-sectional spring of the invention with the conventional round cross-sectional spring. Accordingly, under the same length of the two springs, the invention achieves a higher spring index (C) than the conventional one does, with a weight lighter with 5%~12%, a spring travel longer with 5%~15%, and a maximum stress increased by 10%~20%.

The invention has the following advantages based on the characteristics described previously.

1. With stress uniformly distributed toward two sides of the cross section of the invention, the spring of the invention can thus bear more stress and lengthen its service life, comparing to the conventional spring having stress concentrated to its one side.

2. With an expansion area of the outside cross section in comparison to a general egg cross section, the coefficient of the elasticity (K value) can be stepped up without scarifying its spring travel. Moreover, it is not to make outside stress surpassing inside stress, beneficial for promoting diverse properties of the spring.

3. By properly shrinking the height of the cross section (1A), the spring of the invention can achieve a longer spring travel and a lighter weight, available for being further applied for those needing a smaller and lighter spring.

While the preferred embodiment of the invention has been described above, it will be recognized and understood that various modifications may be made therein and the appended claims are intended to cover all such modifications that may fall within the spirit and scope of the invention.

What is claimed is:

1. A shock-absorbing spring for vehicles, said spring made of a spiral steel bar and characterized by having a deformed egg-shaped cross section with an outline defined by a first arc portion derived from an inner circle, two symmetrical second arc portions respectively derived from a side circle and connecting with said first arc portion, a third arc portion derived from an outer circle, and two tangent lines respectively connecting each of said second arc portions and each end of said third arc portion, an end of each tangent line defined by a corresponding intersection of a single virtual outer circle and the respective second arc portion, and wherein said cross section of said spring is further characterized in that an inner center of the inner circle and a virtual outer center of the virtual outer circle are on a central line with a center distance between said inner center and said virtual outer center, each second arc portion symmetrically disposed on a respective one of two sides of said central line, an outer center of said outer circle also being on said central line; and wherein a side radius of each side circle is larger than a virtual outer radius of said virtual outer circle, said virtual outer radius of said virtual outer circle is larger than an inner radius of said inner circle, and an outer radius of said outer circle is larger than said virtual outer radius of said virtual outer circle.

2. The shock-absorbing spring for vehicles as claimed in claim 1, wherein said cross section of said spring is designed by picking the inner center and the virtual outer center on the central line with the center distance between said inner center and said virtual outer center, determining the inner radius and the virtual outer radius so as to create the inner circle and the virtual outer circle, with a portion of an arc of said inner circle formed as said first arc portion, selecting a preset point on said inner circle and said virtual outer circle respectively for being used as a first and a second intersection point intersected with said side circle, an extended line of said first intersection point of said inner circle and said side circle and said inner center intersecting with that of said second intersection point of said side circle and said virtual outer circle and said virtual outer center at a third intersection point that is a center of said side circle with the side radius, a portion of an arc of each said side circle forming said second arc portions that is symmetrically obtained on two sides of said central line, taking a fourth intersection point of said central line and said virtual outer circle as a starting point to find the outer center of the outer circle on said central line according to a chosen outer radius, said outer circle accordingly created, with a portion of an arc of said outer circle formed as said third arc portion, creating a tangent line of said side circle at said second intersection point with said virtual outer circle to meet with said outer circle.

3. The shock-absorbing spring for vehicles as claimed in claim 1, wherein said spring has a spring index ranging from 4 through 10.

4. The shock-absorbing spring for vehicles as claimed in claim 1, wherein said spring is formed as a straight coil.

5. The shock-absorbing spring for vehicles as claimed in claim 1, wherein said spring is formed as a conical coil.

6. The shock-absorbing spring for vehicles as claimed in claim 1, wherein said spring is formed as a barrel with a larger belly.

* * * * *